US010633595B2

(12) United States Patent
Oluwaseun et al.

(10) Patent No.: US 10,633,595 B2
(45) Date of Patent: Apr. 28, 2020

(54) CHAR SEPARATOR

(71) Applicant: Golden Renewable Energy, LLC, Yonkers, NY (US)

(72) Inventors: Oluwadare Oluwaseun, Yonkers, NY (US); David W. Fowler, Yonkers, NY (US); Anthony F. Tenore, Yonkers, NY (US); Anthony N. Tenore, Yonkers, NY (US)

(73) Assignee: GOLDEN RENEWABLE ENERGY, LLC, Yonkers, NY (US)

( * ) Notice: Subject to any disclaimer, the term of this patent is extended or adjusted under 35 U.S.C. 154(b) by 0 days.

(21) Appl. No.: 16/263,088

(22) Filed: Jan. 31, 2019

(65) Prior Publication Data

US 2019/0185760 A1 Jun. 20, 2019

Related U.S. Application Data

(62) Division of application No. 15/477,312, filed on Apr. 3, 2017.

(Continued)

(51) Int. Cl.
*B01D 53/02* (2006.01)
*C10G 5/02* (2006.01)
(Continued)

(52) U.S. Cl.
CPC ............... *C10G 5/02* (2013.01); *B01D 3/085* (2013.01); *C10B 7/10* (2013.01); *C10B 47/44* (2013.01);
(Continued)

(58) Field of Classification Search
CPC .......... C10G 5/02; C10G 1/02; C10G 70/046; C10G 2300/1003; B01D 3/085; C10B 7/10; C10B 47/44
See application file for complete search history.

(56) References Cited

U.S. PATENT DOCUMENTS 836,701 A 11/1906 Oliver
2,458,068 A 1/1949 Fuller
(Continued)

FOREIGN PATENT DOCUMENTS

CN 202988144 U 6/2013
CN 105542830 A 5/2016
(Continued)

OTHER PUBLICATIONS

U.S. Office Action dated May 3, 2018 in U.S. Appl. No. 15/062,319.
(Continued)

*Primary Examiner* — Christopher P Jones
(74) *Attorney, Agent, or Firm* — Ajay A. Jagtiani; Miles & Stockbridge P.C.

(57) ABSTRACT

The present invention relates to an apparatus that is part of a reusable fuel processing unit that allows the absorption of char contained within vapor that is leaving the reactor including a gear box, gearbox housing, support flange and seal, exhaust housing, exhaust port, connecting flange, screw top split housing, vertical steal housing, three augers with drive shafts on each auger contained within the steel housing, discharge flange, support ring, expansion cart, and cam followers.

9 Claims, 1 Drawing Sheet

68. Gearbox drives.
69. Gearbox housing.
70. Packing seals space.
71. Support flange and seal.
72. Exhaust housing.
73. Exhaust port.
74. Connecting flange.
75. Screw tube split housing.
76. Screw augers with drive shafts.
77. Discharge flange.
78. Support ring.
79. Expansion cart.
80. Cam followers.

Related U.S. Application Data

(60) Provisional application No. 62/318,178, filed on Jun. 21, 2016.

(51) Int. Cl.

| | |
|---|---|
| C10B 53/07 | (2006.01) |
| C10K 1/02 | (2006.01) |
| C10B 47/44 | (2006.01) |
| C10G 1/02 | (2006.01) |
| C10G 1/10 | (2006.01) |
| B01D 3/08 | (2006.01) |
| C10B 7/10 | (2006.01) |
| C10G 70/04 | (2006.01) |

(52) U.S. Cl.
 CPC .............. *C10B 53/07* (2013.01); *C10G 1/02* (2013.01); *C10G 1/10* (2013.01); *C10G 70/046* (2013.01); *C10K 1/02* (2013.01); *C10G 2300/1003* (2013.01); *Y02P 20/143* (2015.11)

(56) References Cited

U.S. PATENT DOCUMENTS

| | | | |
|---|---|---|---|
| 2,616,519 A | 1/1949 | Crankshaw et al. | |
| 2,916,121 A | 8/1953 | Lips et al. | |
| 3,129,459 A | 4/1964 | Kullgren et al. | |
| 3,151,784 A | 10/1964 | Tailor | |
| 3,455,789 A | 7/1969 | Landers | |
| 3,458,321 A | 7/1969 | Reinhart et al. | |
| 3,797,702 A | 3/1974 | Robertson | |
| 3,822,866 A | 7/1974 | Daester et al. | |
| 3,907,259 A | 9/1975 | Leclercq | |
| 3,962,043 A | 6/1976 | Schmalfeld et al. | |
| 3,981,454 A | 9/1976 | Williams | |
| 4,025,058 A | 5/1977 | Mizuguchi | |
| 4,123,332 A | 10/1978 | Rotter | |
| 4,261,225 A | 4/1981 | Zahradnik | |
| 4,426,018 A | 1/1984 | Ward | |
| 4,437,046 A | 3/1984 | Faillace | |
| 4,473,478 A | 9/1984 | Chivrall | |
| 4,500,481 A | 2/1985 | Marx, III | |
| 4,529,579 A | 7/1985 | Raahauge | |
| 4,640,203 A | 2/1987 | Wolter et al. | |
| 4,842,126 A | 6/1989 | McConnell | |
| 5,032,143 A | 7/1991 | Ritakallio | |
| 5,078,857 A | 1/1992 | Melton | |
| 5,129,995 A | 7/1992 | Agarwal | |
| 5,174,479 A | 12/1992 | Dufour | |
| 5,205,225 A | 4/1993 | Milsap, III | |
| 5,394,937 A | 3/1995 | Nieh | |
| 5,611,268 A | 3/1997 | Hamilton | |
| 5,720,232 A | 2/1998 | Meador | |
| 5,732,829 A | 3/1998 | Smith | |
| 5,756,871 A | 5/1998 | Wang | |
| 5,762,666 A | 6/1998 | Amrein et al. | |
| 5,993,751 A | 11/1999 | Moriarty et al. | |
| 6,063,355 A | 5/2000 | Fujimura et al. | |
| 6,109,902 A | 8/2000 | Goris et al. | |
| 6,126,907 A | 10/2000 | Wada | |
| 6,221,329 B1 | 4/2001 | Faulkner et al. | |
| 6,270,630 B1 * | 8/2001 | Xing | C10B 47/30 202/118 |
| 6,276,286 B1 | 8/2001 | Williams et al. | |
| 6,298,751 B1 | 10/2001 | Ide et al. | |
| 6,387,221 B1 | 5/2002 | Schoenhard | |
| 6,455,789 B1 | 9/2002 | Allison | |
| 6,634,508 B1 | 10/2003 | Ishigaki | |
| 6,758,150 B2 | 7/2004 | Ballantine et al. | |
| 7,144,558 B2 | 12/2006 | Smith et al. | |
| 7,301,060 B2 | 11/2007 | Appel et al. | |
| 7,311,509 B2 | 12/2007 | Lupke | |
| 7,476,296 B2 | 1/2009 | Appel et al. | |
| 7,692,050 B2 | 4/2010 | Adams et al. | |
| 7,771,699 B2 | 8/2010 | Adams et al. | |
| 7,906,695 B2 | 3/2011 | Giercke | |
| 8,003,833 B2 | 8/2011 | Appel et al. | |
| 8,200,238 B2 | 6/2012 | Gildea | |
| 8,215,477 B2 | 7/2012 | Basaglia et al. | |
| 8,304,590 B2 | 11/2012 | Hopkins et al. | |
| 8,372,248 B1 | 2/2013 | Sherry | |
| 8,518,218 B2 | 8/2013 | Ali et al. | |
| 8,548,501 B2 | 10/2013 | Gildea | |
| 8,574,325 B2 | 11/2013 | Jensen et al. | |
| 8,801,904 B2 | 8/2014 | Miller et al. | |
| 8,809,606 B2 | 8/2014 | Appel et al. | |
| 8,877,992 B2 | 11/2014 | Appel et al. | |
| 9,045,693 B2 | 6/2015 | Wolfe | |
| 9,052,109 B1 | 6/2015 | Fowler | |
| 9,220,798 B2 | 12/2015 | McKee et al. | |
| 9,275,655 B2 | 3/2016 | Wilson et al. | |
| 9,365,775 B1 * | 6/2016 | La Crosse | C10B 7/10 |
| 9,624,439 B2 | 4/2017 | Bakaya et al. | |
| 9,630,345 B2 | 4/2017 | Alsewailem | |
| 9,795,940 B2 | 10/2017 | Miller et al. | |
| 9,868,597 B2 | 1/2018 | Henry et al. | |
| 9,890,907 B1 * | 2/2018 | Highfield, Jr. | F17D 3/10 |
| 10,233,393 B2 | 3/2019 | Oluwaseun et al. | |
| 2002/0048523 A1 | 4/2002 | Achtelik et al. | |
| 2003/0047437 A1 | 3/2003 | Stankevitch | |
| 2003/0098227 A1 | 5/2003 | Okamoto et al. | |
| 2004/0003481 A1 | 1/2004 | Tarrant | |
| 2004/0144698 A1 | 7/2004 | Hilpert et al. | |
| 2006/0211899 A1 | 9/2006 | Lee | |
| 2007/0179326 A1 | 8/2007 | Baker | |
| 2007/0193408 A1 | 8/2007 | Martinez | |
| 2008/0038071 A1 | 2/2008 | Bodie et al. | |
| 2008/0105141 A1 | 5/2008 | Duperon | |
| 2008/0128259 A1 | 6/2008 | Kostek et al. | |
| 2008/0202983 A1 | 8/2008 | Smith | |
| 2008/0286557 A1 | 11/2008 | Tucker | |
| 2010/0008836 A1 | 1/2010 | Pecci | |
| 2010/0024696 A1 | 2/2010 | Cauley et al. | |
| 2010/0200229 A1 | 8/2010 | Jefferd | |
| 2010/0289175 A1 | 11/2010 | Feichtinger et al. | |
| 2011/0290057 A1 | 12/2011 | Corcoran | |
| 2012/0024106 A1 | 2/2012 | Brotzki | |
| 2012/0024687 A1 | 2/2012 | Bratina et al. | |
| 2012/0261247 A1 | 10/2012 | McNamara et al. | |
| 2012/0289753 A1 * | 11/2012 | Luengo Marin | C08J 11/16 585/240 |
| 2013/0299333 A1 | 11/2013 | Tucker et al. | |
| 2014/0054815 A1 | 2/2014 | Houk et al. | |
| 2014/0121426 A1 | 5/2014 | Tandon | |
| 2014/0332363 A1 | 11/2014 | McGolden | |
| 2015/0023826 A1 | 1/2015 | Desiron | |
| 2015/0053542 A1 | 2/2015 | Liang | |
| 2015/0064297 A1 | 3/2015 | Yang | |
| 2015/0073181 A1 | 3/2015 | Gorke et al. | |
| 2015/0080624 A1 * | 3/2015 | Gephart | C10G 1/10 585/241 |
| 2015/0166911 A1 | 6/2015 | Reed | |
| 2015/0259603 A1 | 9/2015 | Hallowell et al. | |
| 2016/0068771 A1 | 3/2016 | Appel et al. | |
| 2017/0036378 A1 | 2/2017 | Yanev et al. | |
| 2017/0218278 A1 | 8/2017 | Bakaya et al. | |
| 2017/0247618 A1 * | 8/2017 | Ishii | B09B 3/00 |
| 2017/0283707 A1 | 10/2017 | Gephart et al. | |
| 2017/0361329 A1 | 12/2017 | Behrens et al. | |
| 2017/0361558 A1 | 12/2017 | Tenore et al. | |
| 2018/0056262 A1 | 3/2018 | Miller et al. | |
| 2018/0371326 A1 * | 12/2018 | Streiff | C10G 1/086 |

FOREIGN PATENT DOCUMENTS

| | | |
|---|---|---|
| DE | 1769235 A1 | 10/1971 |
| DE | 102 01 869 B4 | 8/2005 |
| DE | 202013007632 U1 | 10/2013 |
| KR | 10-2003-0051913 B1 | 7/2003 |
| KR | 20030051913 | 7/2003 |
| KR | 20030051913 B1 | 7/2003 |
| KR | 1020030051913 | 7/2003 |
| KR | 20050013304 A | 2/2005 |
| KR | 10-0686370 | 2/2007 |

(56) References Cited

FOREIGN PATENT DOCUMENTS

| KR | 100686370 | B1 | 2/2007 |
| KR | 1020090117377 | A | 11/2009 |
| SU | 509433 | A1 | 4/1976 |
| SU | 509433 | A1 | 5/1976 |
| WO | 01/05910 | A1 | 1/2001 |
| WO | 0105910 | A1 | 1/2001 |
| WO | 2008017953 | A2 | 2/2008 |
| WO | 2009129233 | A2 | 10/2009 |

OTHER PUBLICATIONS

U.S. Office Action dated Jun. 6, 2018 in U.S. Appl. No. 15/641,471.
Office Action received in U.S. Appl. No. 15/641,471 dated Feb. 12, 2018.
Office Action received in U.S. Appl. No. 15/062,319 dated Feb. 2, 2018.
Search Report and Written Opinion received in PCT Application No. PCT/IB2017/053713 dated Sep. 20, 2017.
Search Report and Written Opinion received in PCT Application No. PCT/IB2017/053714 dated Sep. 20, 2017.
Search Report and Written Opinion received in PCT Application No. PCT/IB2017/052811 dated Aug. 7, 2017.
Search Report and Written Opinion received in PCT Application No. PCT/IB2017/053667 dated Sep. 12, 2017.
Search Report and Written Opinion received in PCT Application No. PCT/IB2017/054058 dated Nov. 9, 2017.
Non-Final Office Action in corresponding U.S. Appl. No. 15/477,312 dated Sep. 17, 2018.
Non-Final Office Action in corresponding U.S. Appl. No. 15/054,903 dated Oct. 3, 2018.
Non-Final Office Action in corresponding U.S. Appl. No. 15/593,579 dated Oct. 3, 2018.
Non-Final Office Action in corresponding U.S. Appl. No. 15/641,471 dated Oct. 25, 2018.
Office Action received in U.S. Appl. No. 15/641,471 dated Apr. 1, 2019.
Office Action received in U.S. Appl. No. 15/628,844 dated Feb. 26, 2019.
Office Action received in U.S. Appl. No. 15/628,922 dated Apr. 29, 2019.
Office Action received in U.S. Appl. No. 16/263,088 dated May 8, 2019.
Office Action received in U.S. Appl. No. 16/263,088 dated Aug. 29, 2019.
Office Action received in U.S. Appl. No. 15/641,471 dated Aug. 15, 2019.
Office Action received in U.S. Appl. No. 15/628,844 dated Jun. 19, 2019.
Office Action received in U.S. Appl. No. 15/628,922 dated Aug. 27, 2019.
Office Action received in U.S. Appl. No. 15/628,844 dated Sep. 11, 2019.
Office Action received in U.S. Appl. No. 15/628,922 dated Nov. 5, 2019.
Office Action received in Australian Patent Application No. 2017293458 dated Oct. 31, 2019.
Office Action received in New Zealand Patent Application No. 749216 dated Nov. 15, 2019.
Official Action received in Chilean Application No. 201803679 dated Aug. 1, 2019.
Office Action received in U.S. Appl. No. 15/641,471 dated Sep. 27, 2019.

* cited by examiner

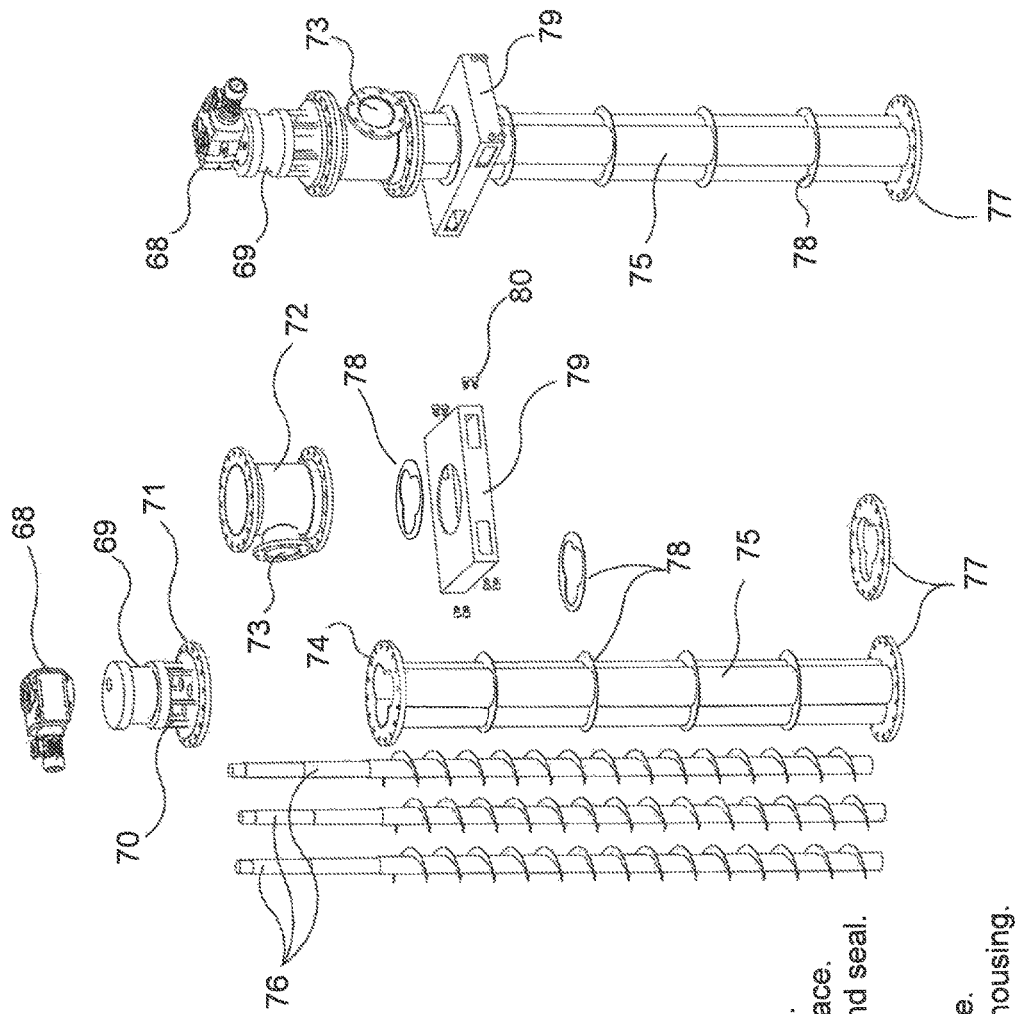
68. Gearbox drives.
69. Gearbox housing.
70. Packing seals space.
71. Support flange and seal.
72. Exhaust housing.
73. Exhaust port.
74. Connecting flange.
75. Screw tube split housing.
76. Screw augers with drive shafts.
77. Discharge flange.
78. Support ring.
79. Expansion cart.
80. Cam followers.

CHAR SEPARATOR

CROSS-REFERENCE TO RELATED APPLICATIONS

This application priority to U.S. Provisional Patent Application No. 62/318,178, entitled "CHAR SEPARATOR," filed Apr. 4, 2016. The entire contents and disclosures of this patent application is incorporated herein by reference in its entirety.

This application discloses material that is related to material disclosed in a nonprovisional application filed on Dec. 9, 2015, titled "Heated Airlock Feeder Unit", incorporated herein in its entirety by reference as well as the nonprovisional application filed on Dec. 9, 2015 titled "Cyclonic Cooling System" incorporated herein in its entirety by reference.

BACKGROUND OF THE INVENTION

Field of the Invention

This application relates to an apparatus that is part of a re-useable fuel processing unit. This apparatus allows for the absorption of char contained within vapor that is leaving the reactor. The char, or carbon ash, that this apparatus allows for the absorption of, is created when the shredded plastic that enters the reactor makes contact with the reactor's hot surface area. As the shredded plastic makes contact with the reactor's hot surface, it is spread thin across the reactor's surface and the reactor's heat vaporizes the shredded plastic as it was designed to do. A thin layer of the shredded plastic as well as the contaminants contained within the shredded plastic is left behind on the reactor's steel tubing and as is cooked to a solid char and then becomes airborne. Small particles of char, 3 micron or smaller, become airborne and travel with the fuel vapors. This char is collected with the vapors and condensed into a liquid in high concentrations and makes the produced fuel an extremely thick liquid because the char is a solid particulate contained within the liquid. This particular carbon char is required to be removed from the fuel in order to produce a higher quality fuel. The know art typically uses the following methods to remove char from liquid fuel: filtering to remove larger particulate matter from the fuel, but filters will become clogged and require periodic cleaning; distillation which can remove 99.9% of the carbon matter, but distillation is a sub-process outside the reactor that raises the cost of producing the re-useable fuel; cyclone systems are often used and try to remove most of the particles but can only remove large particles and the cyclone requires a heat source to prevent the vapors from condensing and forming liquid that re-collect the char; and, bag filters that are to limited to the heat the filter bags can withstand and will fail if they absorb liquid fuel.

SUMMARY

The Char Separator consists of a gear box drive, gearbox housing, support flange and seal, exhaust housing, exhaust port, connecting flange, screw top split housing, vertical steel housing, three augers with drive shafts on each auger contained within the steel housing, discharge flange, support ring, expansion cart, and cam followers.

BRIEF DESCRIPTION OF THE DRAWINGS

The accompanying drawing illustrates the preferred embodiments of the present invention according to the best mode presently devised for making and using the instant invention, and in which:

FIG. 1 depicts the Char Separator.

DESCRIPTION OF PREFERRED EXEMPLAR EMBODIMENTS

The Char separator eliminates the problems discussed above with the prior art. The Char Separator depicted in FIG. 1 consists of three screw conveyor augers FIG. 1 at 76 running in a vertical split tube FIG. 1 at 75 that are placed so that their flights intersect with each other. The augers FIG. 1 at 76 provide for a downward rotation, cleaning each other from buildup as their flights intersect. As the hot vapors leave the reactor and enter the vertical tube FIG. 1 at 76, they travel upward in the auger tubes FIG. 1 at 75. The vapors lose heat as they rise up the vertical tube. The temperature in the column is controlled so that the favored hydrocarbon chain vapors pass through the vertical tube and leave the vertical tube at the discharge FIG. 1 at 73 where the vapors are collected. As the vapors rise and the temperature of the vapors is reduced to the value at where a high carbon chain fuel will condense, it will collect on the augers FIG. 1 at 76 where the augers FIG. 1 at 76 will push the condensed fuel back to the reactor. The condensed hydrocarbon fuel is a sticky substance. The vapors flowing up the vertical tube FIG. 1 at 75 will travel across the sticky fuel condensed on the augers FIG. 1 at 76 where the sticky substance will catch the carbon ash that is traveling with the vapors as the carbon ash is constantly looking for a substance to which to make contact. The collected mass on the augers FIG. 1 at 76 is then forced down into the lower reactor where it returns to the reactor's heat returns to a heat zones through the discharge flange FIG. 1 at 77. The collected mass is then reheated in the lower reactor of the re-useable fuel apparatus in which it vaporizes, breaking high carbon chains into lower carbon chains. The lower carbon chains will then travel back through the vertical tube FIG. 1 at 75 and any carbon ash that travels with it will stick again to the augers FIG. 1 at 76 and be returned and any lower carbon vapors will pass through the vertical tube FIG. 1 at 75 and be discharged from the exhaust port FIG. 1 at 73 to the fuel cooling system. The amount of heat rise in the columns can be controlled by both the RPM of the augers and the outside insulation of the column. The auger gear drive FIG. 1 at 69 uses spur gears to control the rotation and timing of the augers FIG. 1 at 76. By controlling the heat in the vertical tube FIG. 1 at 75 the carbon-chain hydrocarbon fuel selected by the heat value chosen will be allowed to pass through. The construction of this vertical tube is unique in itself. It consists of three split tubes FIG. 1 at 75 encircling the augers in a clover shape. The shape is weld together and supported with outer bands FIG. 1 at 78 to keep the shape intact due to heat warping. The discharge gases are expected to be over 500 degrees Fahrenheit and may overheat the gear box FIG. 1 at 69. To prevent the gearbox oil from overheating an air gap FIG. 1 at 70 is designed in the unit. The vertical tube is attached to the lower reactor and travels with the reactors expansion, so it itself is supported with a rolling cart FIG. 1 at 79 located at its top. Where the column attaches to the reactor, that section of the reactor is smaller in diameter and uses a ribbon type flight to allow for faster removal of solids while allowing vapors to pass back through the ribbon flights 18.

This section has a reverse rotation to the main auger located within the reactor where the main auger is pushing any dry char or heavy fuel deposits towards the char discharge. This section of the main reactor has two controlled heated zones that will re-heat and help in thermal cracking the high carbon chains that are pushed back into the main reactor by the Char Separator.

The invention claimed is:

1. A method of producing fuel comprising:
vaporizing a carbon-based material in a reactor into hydrocarbon chain vapors and handling the hydrocarbon chain vapors within a generally vertical arrangement,
wherein handling the hydrocarbon chain vapors includes vertically processing and capturing the hydrocarbon chain vapors and condensing the same into high carbon chain fuel in a generally vertical direction of the generally vertical arrangement;
reheating the high carbon chain fuel until it vaporizes to break high carbon chains into lower carbon chains to produce low carbon vapor;
manipulating the hydrocarbon chain vapors within two controlled heating zones of the reactor;
vertically processing and capturing the low carbon vapor in a generally vertical direction of the generally vertical arrangement; and
collecting the low carbon vapor.

2. The method of claim 1, wherein the carbon-based material is plastic.

3. The method of claim 1, wherein the carbon-based material is heated at a prescribed temperature until the carbon-based material is vaporized.

4. The method of claim 1, wherein the carbon-based material is pressurized at a prescribed pressure until the carbon based material is vaporized.

5. The method of claim 1, wherein the vertical arrangement comprises a vertical tube.

6. The method of claim 5, wherein the vertical tube comprises a plurality of augers disposed vertically therein for manipulating the hydrocarbon chain vapors and the low carbon vapor in a generally vertical direction within the vertical tube.

7. The method of claim 6, wherein the heat is controlled to manipulate the hydrocarbon chain vapors by adjusting the RPM of the plurality of augers and an outside insulation of the vertical tube.

8. The method of claim 5, further comprising:
expelling discharge gases at over 500 degrees Fahrenheit from the reactor.

9. The method of claim 8, wherein discharge gases are expelled from an air gap of a gearbox of the reactor.

* * * * *